(12) United States Patent
Ferris et al.

(10) Patent No.: US 12,044,341 B2
(45) Date of Patent: Jul. 23, 2024

(54) HOSE SUPPORT ASSEMBLY

(71) Applicant: ETN Capital, LLC, Sanford, NC (US)

(72) Inventors: Bruce Seymour Ferris, Richmond, VA (US); Kristin Schmidt, Charlottesville, VA (US)

(73) Assignee: ETN Capital, LLC, Sanford, NC (US)

( * ) Notice: Subject to any disclaimer, the term of this patent is extended or adjusted under 35 U.S.C. 154(b) by 0 days.

(21) Appl. No.: 18/241,344

(22) Filed: Sep. 1, 2023

(65) Prior Publication Data

US 2024/0011583 A1 Jan. 11, 2024

Related U.S. Application Data

(63) Continuation of application No. 17/859,616, filed on Jul. 7, 2022, now Pat. No. 11,821,551.

(51) Int. Cl.
*F16L 3/02* (2006.01)
*F16L 3/26* (2006.01)
*F16M 11/38* (2006.01)

(52) U.S. Cl.
CPC ...... *F16L 3/26* (2013.01); *F16L 3/02* (2013.01); *F16M 11/38* (2013.01)

(58) Field of Classification Search
CPC . F16L 3/26; F16L 3/015; F16L 3/1066; F16L 3/10; F16L 3/02; F16L 3/1226; F16M 11/38; B05B 15/063; E03F 1/008; E03C 1/021
USPC ..................................................... 248/89–93
See application file for complete search history.

(56) References Cited

U.S. PATENT DOCUMENTS

| | | | |
|---|---|---|---|
| 3,819,137 A | 6/1974 | Smith | |
| 4,082,242 A * | 4/1978 | Smith | F16L 3/00 248/167 |
| 4,406,434 A | 9/1983 | Schneckloth | |
| 4,722,500 A | 2/1988 | Bray | |
| 5,431,455 A | 7/1995 | Seely | |
| 5,915,411 A | 6/1999 | Gilbert et al. | |
| 6,003,819 A | 12/1999 | Hall | |
| 6,619,596 B1 * | 9/2003 | Caine | F16L 3/00 248/83 |
| 7,425,028 B1 | 9/2008 | Angel et al. | |
| 7,434,771 B1 * | 10/2008 | Tai | F16L 3/00 248/89 |
| 9,211,847 B1 | 12/2015 | Cox et al. | |
| 11,208,057 B2 * | 12/2021 | Su | B60R 15/00 |

(Continued)

OTHER PUBLICATIONS

Camco, "Camco 20 Ft (43051) Sidewinder RV Sewer Hose Support, Made from Sturdy Lightweight Plastic, Won't Creep Closed, Holds Hoses in Place—No Need for Straps", Retrieved from the internet: URL: https://www.amazon.com/Camco-Sidewinder-Support-Lightweight-Plastic/dp/B000BUU5WW/ref=sr_1_3?keywords=sewer+hose+support&qid=1632938066&sr=8-3 [retrieved on Jul. 7, 2022], Oct. 19, 2005, pp. 1-4.

*Primary Examiner* — Nkeisha Smith
(74) *Attorney, Agent, or Firm* — COATS & BENNETT, PLLC

(57) ABSTRACT

A hose support assembly for supporting a hose. The hose support assembly includes a series of panels that are connected together by links. The assembly is adjustable between an extended orientation to support the hose, and a folded orientation for storage when not in use. The panels are configured such that the assembly supports the hose at a decreasing height above the ground to facilitate drainage of fluids in the hose.

20 Claims, 14 Drawing Sheets

(56) References Cited

U.S. PATENT DOCUMENTS

2007/0210215 A1   9/2007 Prest
2012/0292462 A1  11/2012 Marshall
2016/0018022 A1   1/2016 Boutin

* cited by examiner

HOSE SUPPORT ASSEMBLY

RELATED APPLICATIONS

This application is a continuation application of U.S. patent application Ser. No. 17/859,616 filed Jul. 7, 2022, the disclosure of which is incorporated by reference herein in its entirety as if made part of the present application.

TECHNICAL FIELD

The present application relates generally to a support assembly for a hose and, more specifically, to a support assembly having interconnected members that are movable between an extended orientation to support the hose and a folded orientation for storage.

BACKGROUND

There are various hose support devices for supporting a hose to allow fluids to flow along the hose. One example is a device for supporting a sewer hose for a recreational vehicle (RV). The device supports the hose between the RV and a drain. Fluid from the RV enters the hose and moves along the length to the drain. Existing devices suffer from a variety of issues that prevent them from being effectively used to support a hose.

Some existing devices are unstable and tip over when supporting the hose. The instability can prevent the device from being set up to support the hose and/or tipping over after the device has been set up and fluid is moving along the length of the hose. In each of these instances, the instability prevents the fluid from flowing along the length of the hose and reaching the drain. The instability is further aggravated when the device is used on an uneven surface, such as at a campground when use with an RV.

Another issue with some devices is the difficulty in setting the device up to support the hose. The devices can include multiple individual pieces that are required to be attached together before being able to support the hose. Devices can also be difficult to adjust and/or move once they have been deployed.

Existing support assemblies can be flimsy with components and/or connections that bend, separate, or otherwise limit the sturdiness. This non-substantial construction can prevent the assembly from adequately supporting the hose. This can lead to various issues, such as the hose falling onto the ground, or not being supported with a downward angle which prevents drainage. In one example, the assembly is equipped with an attachable handle to carry the assembly in a folded orientation when not in use. The flimsy construction can cause the handle to detach causing the assembly to deploy and leaving the user with a tangled mess of components.

Some devices are relatively large in size. This size makes the devices difficult to store when not in use. For example, a device that is used to support a hose on a RV may be stored in the vehicle when not in use. The large size makes storage difficult as there is limited space in an RV and the existing space may not be adequate to house the device when not in use.

SUMMARY

One aspect is directed to a hose support assembly to support a hose above a surface. The hose support assembly comprises a plurality of panels connected together in a series from a first panel to a second panel. Each of the panels comprises: a bottom side configured to contact against the surface; a saddle with an edge configured to contact against the hose; and a saddle height measured between the edge and the bottom side. A plurality of links connect together adjacent ones of the panels. Each of the links comprise: a first end configured to connect to a first one of the panels and a second end configured to connect to a second one of the panels. The saddle heights of the plurality of panels progressively decreases from the first panel to the second panel. Each of the links interconnecting adjacent ones of the panels and is positioned entirely below lowest points on the edges of the saddles of the adjacent panels.

In another aspect, the saddle heights of at least two of the adjacent panels is equal.

In another aspect, the links comprise a rectangular shape.

In another aspect, the links are connected to the panels only between a lowest point on the edge of the saddle and the feet to be positioned away from the hose.

In another aspect, each of the links is connected at a first hinge to a first one of the adjacent panels and at a second hinge to a second one of the adjacent panels.

In another aspect, the saddle is a first saddle, and each of the panels further comprises a second saddle positioned between feet on the bottom side and with the first saddle and the second saddle comprising different heights.

In another aspect, the edge comprises a first curvature in a first plane that extends between lateral sides of the panel and a second curvature in a second plane that extends between front and back sides of the panel.

In another aspect, the assembly is movable between an extended orientation and a folded orientation with the extended orientation comprising the panels spaced apart by gaps and the links bridging the gaps, and the folded orientation comprising the links nested in the panels.

In another aspect, the receptacle comprises a back surface, side walls that extend around a perimeter of the receptacle, and an open side that faces outward away from the back surface.

One aspect is directed to a hose support assembly to support a hose above a surface. The hose support assembly comprises a plurality of panels connected together in a series from a first panel to a second panel. Each of the panels comprises: a first side; an opposing second side; a top edge with a saddle having a curved shape configured to contact against the hose; a bottom edge; a first lateral edge that extends between the top edge and the bottom edge; a second lateral edge that extends between the top edge and the bottom edge; a first connector that extends outward from the first side; and a second connector that extends outward from the second side. The assembly also comprises a plurality of links with each of the links connecting together adjacent ones of the panels with each of the links comprising an elongated shape with a first mount that mounts with the first connector and forms a first hinge and a second mount that mounts with the second connector and forms a second hinge. The first hinge is positioned in proximity to and spaced inward from the first lateral edge of the panel. The second hinge is positioned in proximity to and spaced inward from the second lateral edge of the panel.

In another aspect, the panels further comprise a receptacle that is recessed into the first side, wherein the receptacle is sized to receive one of the links such that the link is nested in the panel when the hose support assembly is in a folded orientation.

In another aspect, the receptacle comprises a back surface, side walls that extend along a perimeter of the receptacle, and an open side that faces outward away from the back surface with the link positioned in contact with the back surface in the folded orientation.

In another aspect, the first connector is positioned in the receptacle.

In another aspect, the first and second hinges are positioned below a bottom of the saddle.

In another aspect, the saddle has an elliptical shape.

In another aspect, the saddle is a first saddle and each of the panels further comprises a second saddle positioned along the bottom edge with the first saddle and the second saddle comprising different heights.

In another aspect, the hose support assembly is movable between an extended orientation and a folded orientation with the extended orientation comprising the panels spaced apart by gaps and the links bridging the gaps, and the folded orientation comprising the links nested in the panels.

In another aspect, the first hinge and the second hinge each comprise a rotation axis with the rotation axes spaced inward from the lateral sides of the panel and with the rotation axis of the first hinge parallel with the rotation axis of the second hinge.

One aspect is directed to a hose support assembly to support a hose above a surface. The hose support assembly comprises a plurality of links comprising an elongated shape with a first end and an opposing second end. A plurality of panels are connected together in a series from a first panel to a second panel. Each of the panels comprises: a first side; a recess that extends into the first side; an opposing second side; a top edge with a saddle configured to receive the hose; a bottom edge; a first lateral edge that extends between the top edge and the bottom edge; a second lateral edge that extends between the top edge and the bottom edge; a first hinge that extends outward from the first side and is spaced inward from the first lateral edge with the first hinge pivotally connecting the panel to the first end of a first one of the links; and a second hinge that extends outward from the second side and is spaced inward from the second lateral edge with the second hinge pivotally connecting the panel to the second end of a second one of the links. The hose support assembly is movable between an extended orientation and a folded orientation with the extended orientation comprising the panels spaced apart by gaps and the links bridging the gaps, and the folded orientation comprising the links nested in the receptacles of the panels.

In another aspect, the links are positioned entirely below the saddles of adjacent ones of the panels.

The features, functions and advantages that have been discussed can be achieved independently in various aspects or may be combined in yet other aspects, further details of which can be seen with reference to the following description and the drawings.

DETAILED DESCRIPTION

Figure 1A:
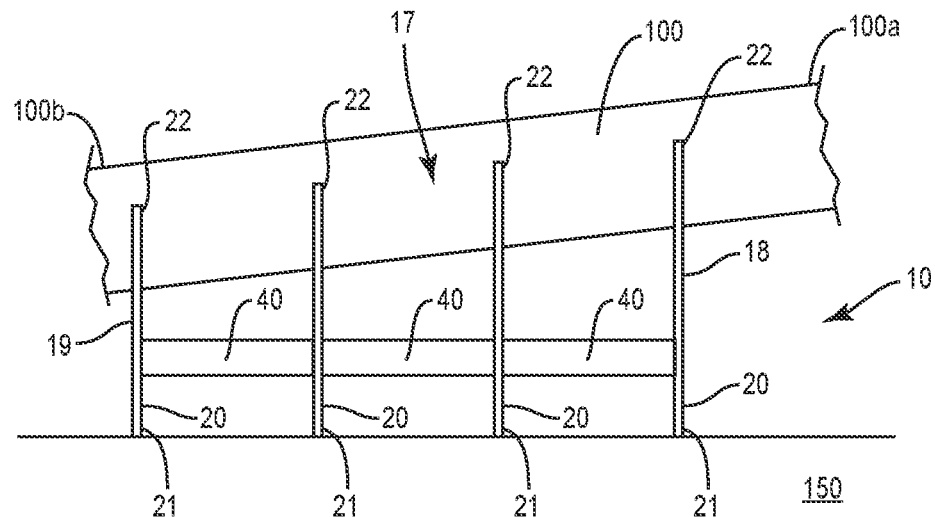
FIG. 1A is a schematic side view of a hose support assembly supporting a hose above a surface.

The present application is directed to a hose support assembly 10 (hereinafter "assembly 10") for supporting a hose 100. The assembly 10 includes a series of panels 20 that are connected together in a series by links 40. The assembly 10 is adjustable between an extended orientation to support the hose 100, and a folded orientation for storage when not in use. The panels 20 are configured such that the assembly 10 supports the hose 100 at a progressively decreasing height above a surface 150 to facilitate drainage of fluid through the hose 100.

Figure 1B:
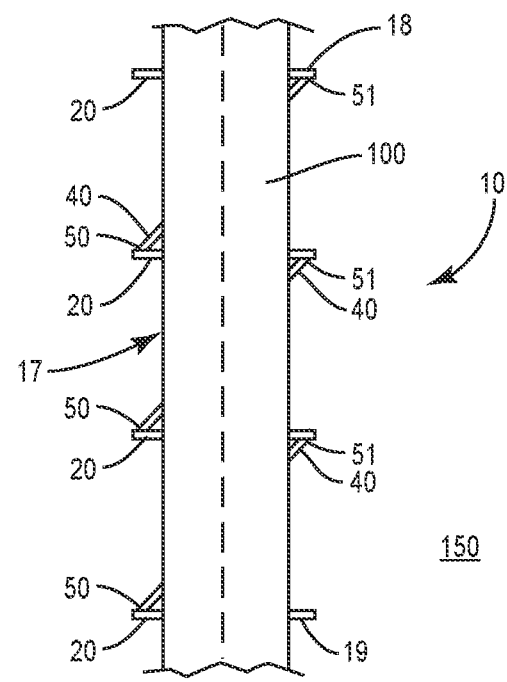
FIG. 1B is a top view of the hose support assembly of FIG. 1A.

FIGS. 1A and 1B schematically illustrate an assembly 10 in an extended orientation supporting a hose 100 at an elevated position above a surface 150. The assembly 10 includes a first end 18 and a second end 19 with a saddle area 17 that supports the hose 100. The assembly 10 includes panels 20 that are spaced apart and connected together by links 40. Each of the panels 20 includes a first end 21 configured to contact against the surface 150 and a second end 22 configured to support the hose 100. The links 40 include a first end configured to connect to a first panel 20 and a second end configured to connect to a second panel 20. The number of panels 20 and links 40 can vary depending upon the context of use. The assembly 10 is configured such that the first end 18 positions the hose section 100a at a higher elevation above the surface 150 than the second end 19. The assembly 10 progressively decreases in height above the surface 150 from the first end 18 to the second end 19 to provide for a fall line for fluid to flow along the length of the hose 100.

Figure 2A:
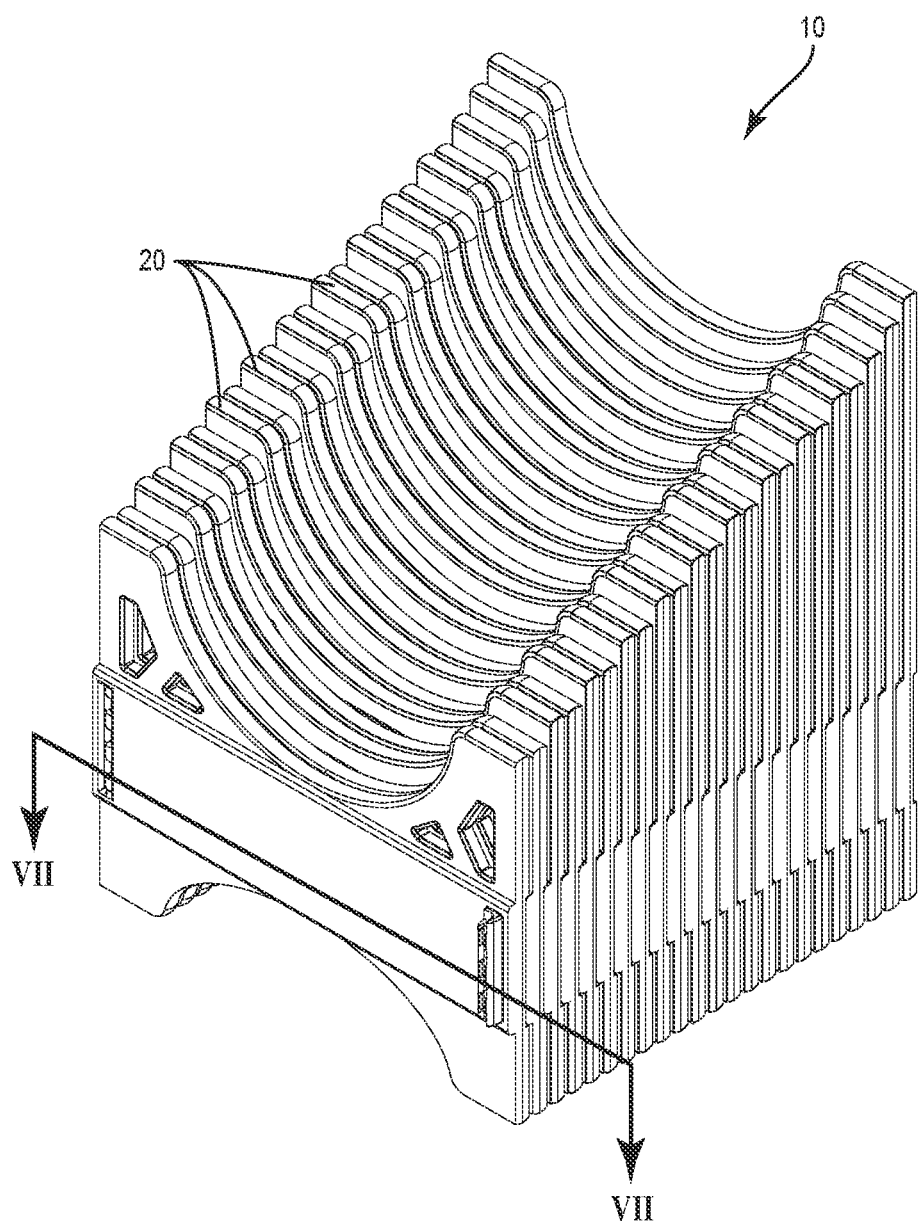
FIG. 2A is a perspective view of an assembly in a folded orientation.
Figure 2B:
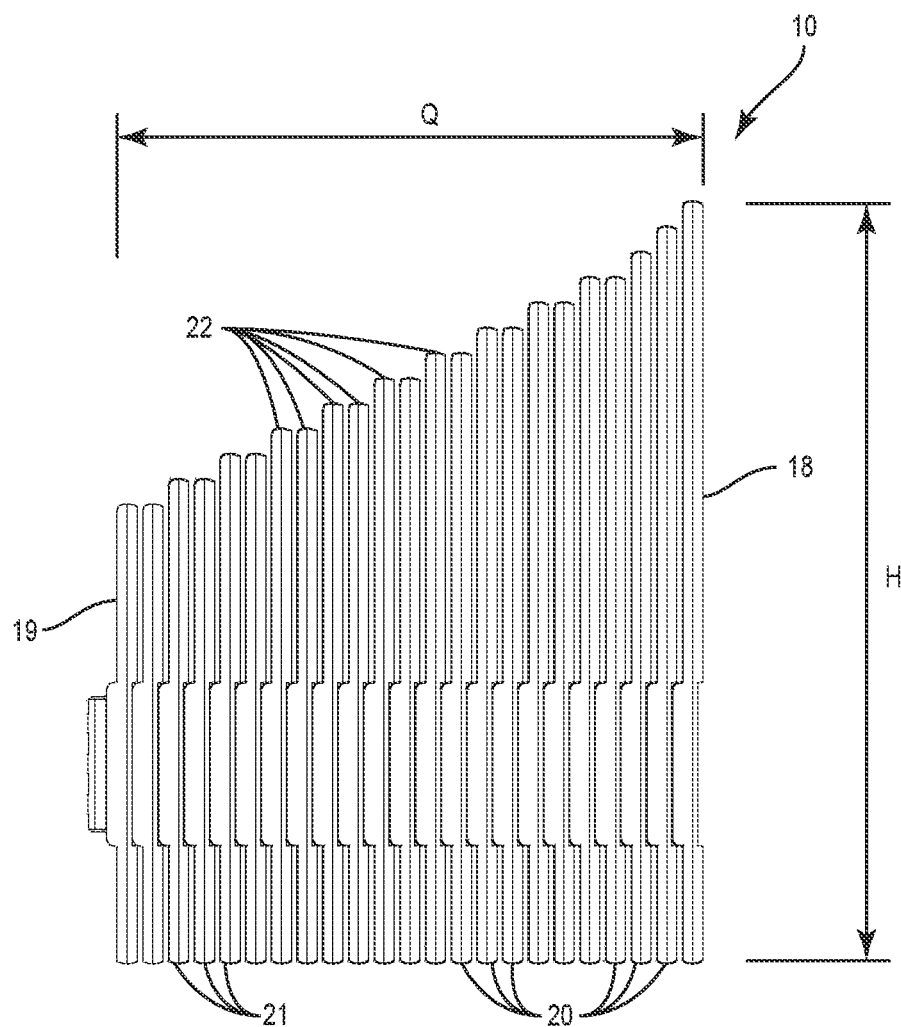
FIG. 2B is a side view of the assembly of FIG. 2A in the folded orientation.
Figure 2C:
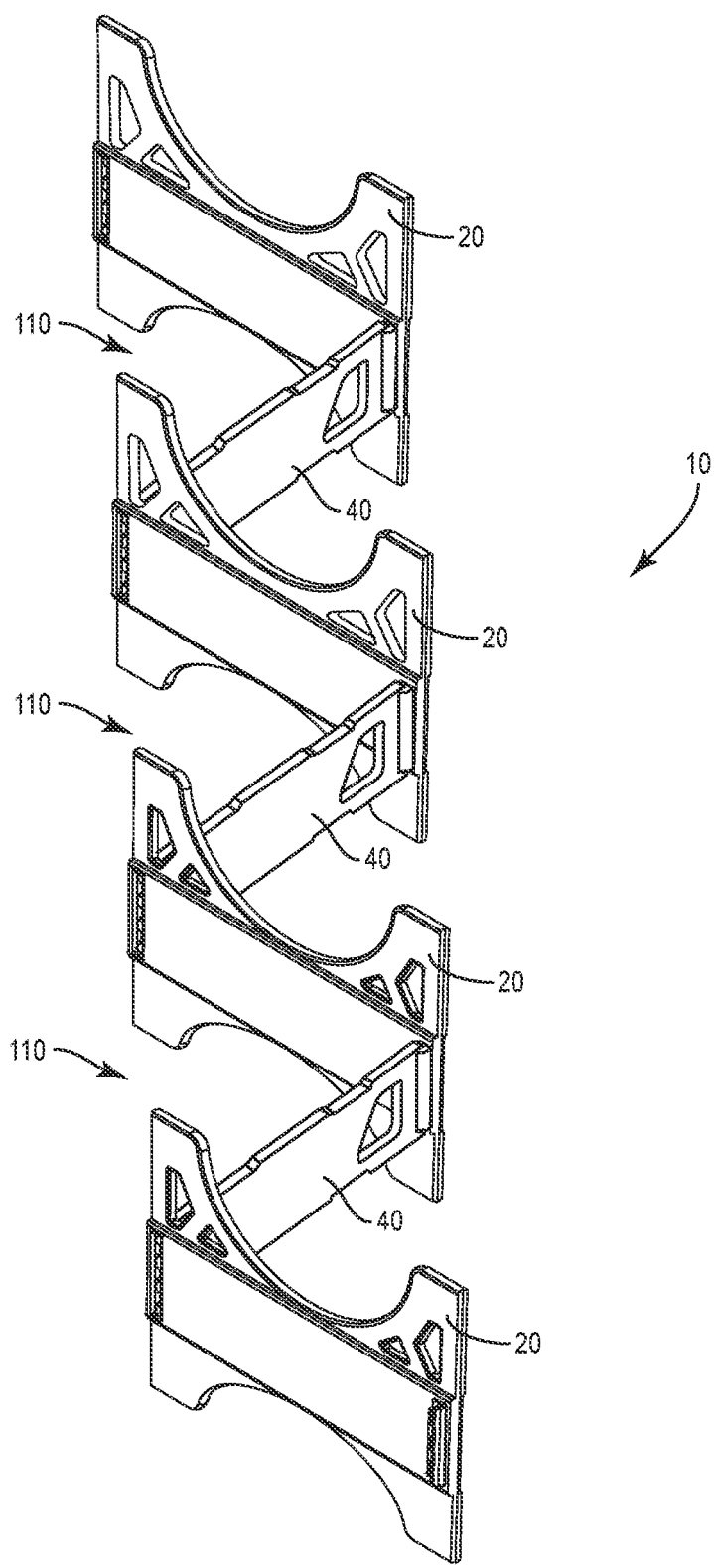
FIG. 2C is a perspective view of the assembly of FIGS. 2A and 2B in an extended orientation.

FIGS. 2A, 2B, and 2C illustrate an assembly 10. FIGS. 2A and 2B illustrate the assembly 10 in a folded orientation and FIG. 2C illustrates the assembly 10 in an extended orientation. The assembly 10 includes panels 20 that are connected together by links 40. In the folded orientation, the panels 20 are positioned together in a side-by-side alignment to minimize the overall size of the assembly 10. The panels 20 can be aligned parallel to one another in the folded orientation as illustrated in FIGS. 2A and 2B. In one example as illustrated in FIG. 2B, the adjacent panels 20 contact together to minimize the size. Other examples can include one or more of the panels 20 aligned in various positions in the folded orientation, including but not limited to non-parallel alignment, and with gaps positioned between the adjacent panels 20.

As illustrated in FIG. 2B, the panels 20 include a height H measured between the first end 21 and the second end 22. The panels 20 are connected together such that the first ends 21 are aligned in a plane to contact against the surface 150. The height H of the panels 20 progressively decreases from a first end 18 of the assembly 10 to a second end 19. In one example as illustrated in FIG. 2B, two or more adjacent panels 20 include the same height. In another example, each panel 20 has a progressively smaller height H from the first end 18 to the second end 19.

As illustrated in FIG. 2C, in the extended orientation the panels 20 are spaced apart by gaps 110. The panels 20 can be aligned parallel to each other in the extended orientation or can be arranged at various non-parallel positions. The links 40 bridge the gaps 110 and connect to each of the adjacent panels 20. The links 40 extend diagonally across the gaps 110 as each is connected in proximity to a first lateral side of a first panel 20 and in proximity to an opposing lateral side of an adjacent second panel 20. The links 40 can be aligned in parallel arrangement in the extended position, or various non-parallel alignments.

Figure 3A:
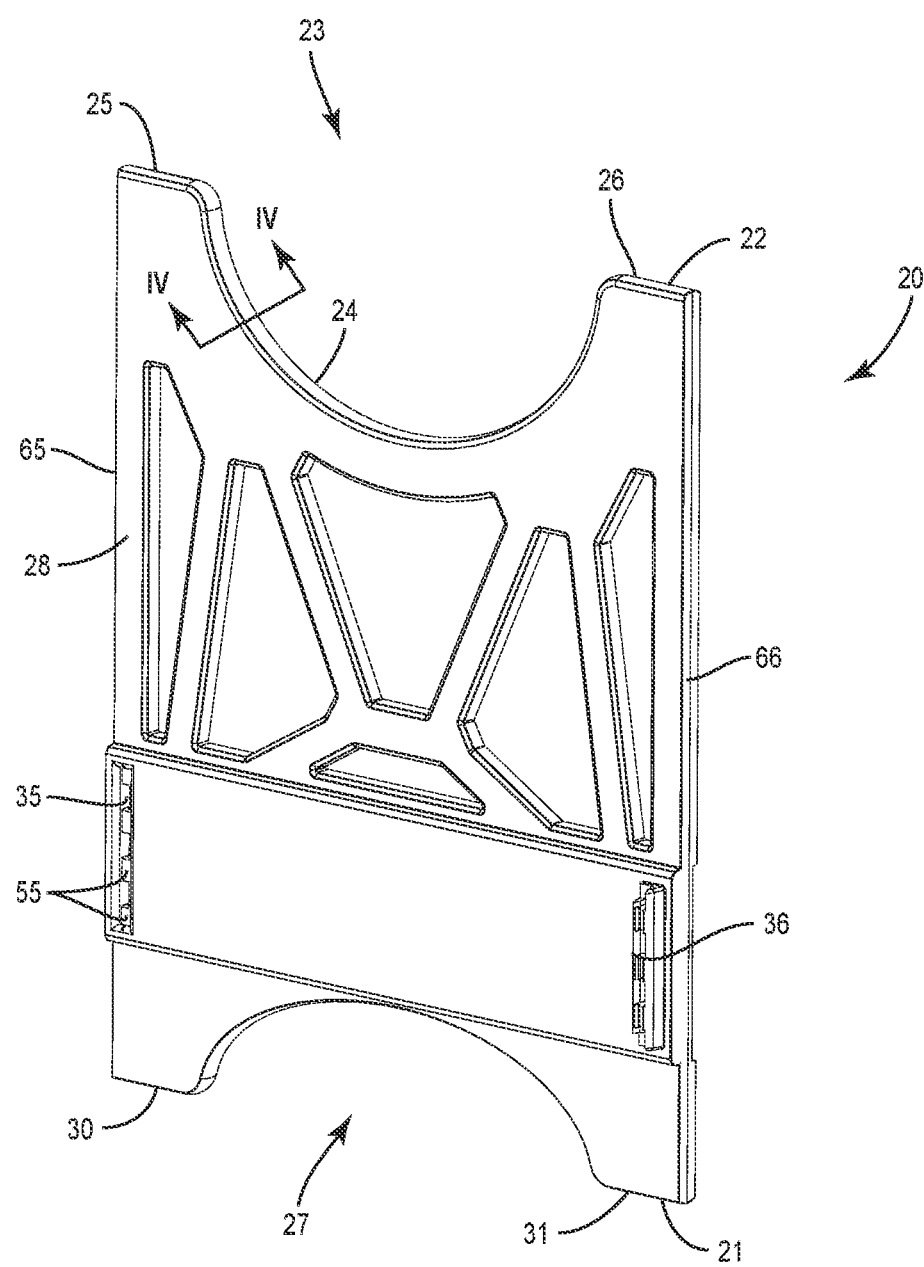
FIG. 3A is a perspective view of a first side of a panel.
Figure 3B:
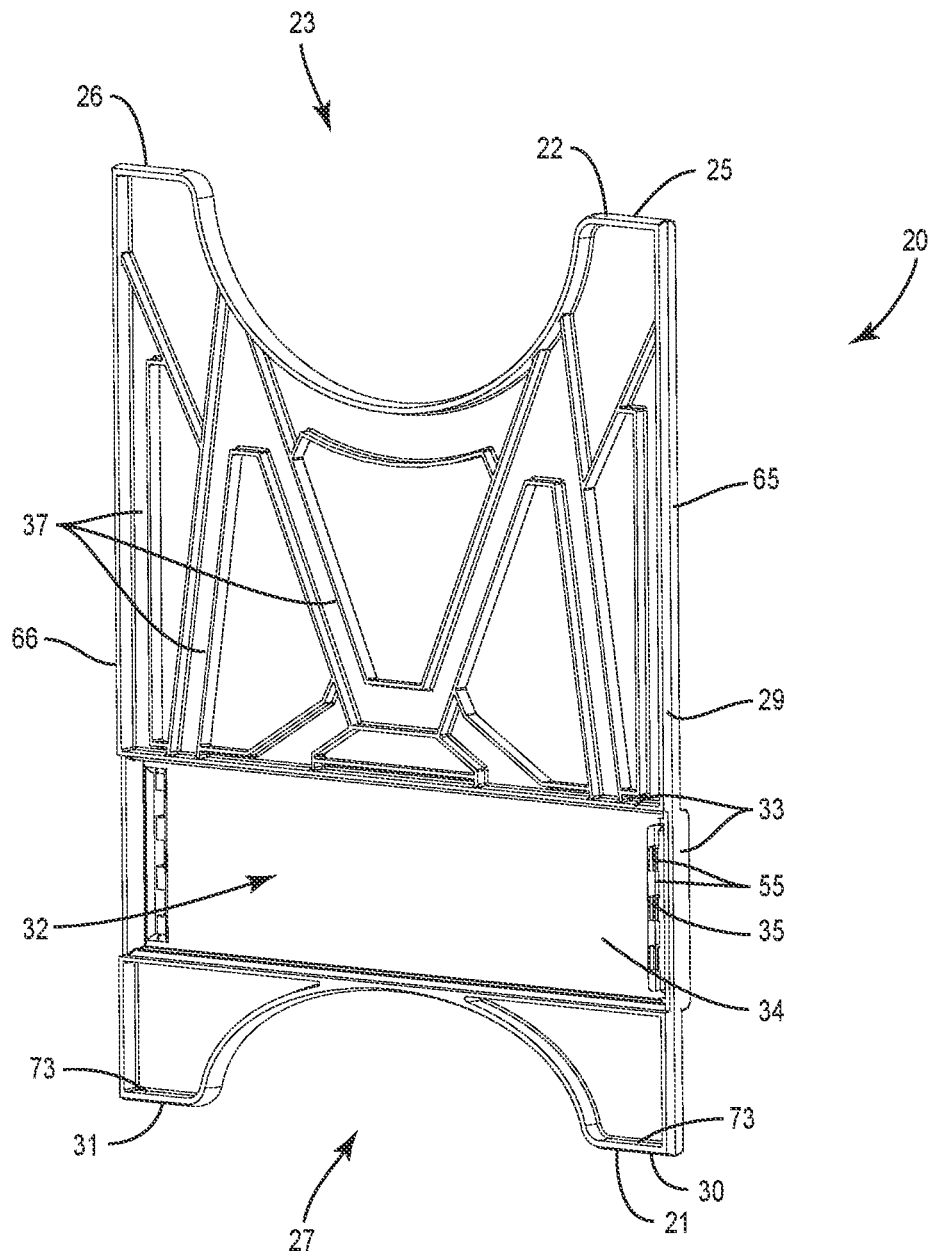
FIG. 3B is a perspective view of a second side of the panel of FIG. 3A.

FIGS. 3A and 3B illustrate a panel 20. The panel 20 includes the first end 21 configured to contact against the surface 150, and an opposing second end 22. The panel 20 includes a first side 28 that faces in a first direction (e.g., forward) and an opposing second side 29 that faces in a second direction (e.g., backwards). In one example, each of the first and second sides 28, 29 are substantially planar with a thickness of the panel 20 measured between the sides 28, 29 being substantially constant along the panel 20. Other examples include variations in the thickness.

The panel 20 includes a saddle 23 at the second end 22. The saddle 23 is formed by a curved edge 24 that is formed between posts 25, 26. This curvature is in a first plane that extends between the lateral sides 65, 66 of the panel 20. In one example, the curved edge 24 has an elliptical shape.

In one example as illustrated in FIGS. 3A and 3B, the saddle 23 includes the edge 24 with a curved shape that extends between the posts 25, 26. In another example, the saddle 23 includes a non-curved shape that extends between the posts 25, 26. In one specific example, the saddle 23 includes an edge 24 with a bottom section that extends along a middle of the panel 20 and opposing upward sections in proximity to each of the lateral sides. This gives the saddle 23 a substantially U-shape. The upward sections be aligned at various angles relative to the bottom section, including perpendicular and non-perpendicular angles. In another example, the saddle 23 includes the edge 24 with a first section that extends from the first post 25 inward towards a midpoint of the panel 20, and a second section that extends inward from the second post 26. Each of the first and second sections angle downward such that a depth of the saddle 23 is largest at the midpoint and tapers upward to the top of the posts 25, 26. In the various examples, the various sections of the edge 24 can be straight or can have various shapes.

Figure 4:
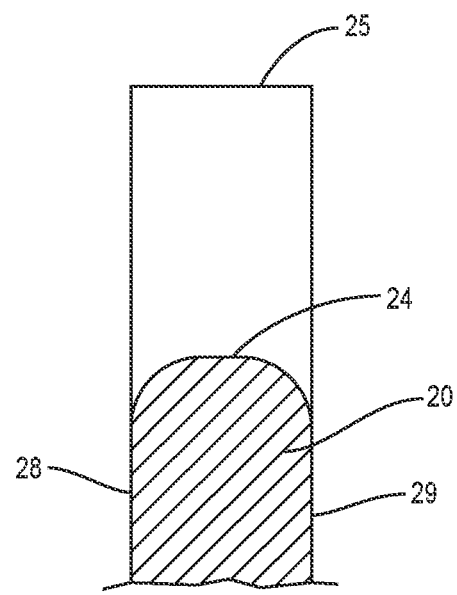
FIG. 4 is a sectional view cut along line Iv-Iv of FIG. 3A of a curved surface of a receptacle.

As illustrated in FIG. 4, the edge 24 also features a curved shape in a second plane that extends between the first side 28 and the second side 29. This curved shape between the first and second sides 28, 29 provides for the hose 100 to slide across the panel 20 when the assembly 10 is being deployed and the hose 100 is being supported by the panel 20.

The first end 21 includes posts 30, 31 that are spaced apart and form feet to contact against the surface 150. The first end 21 also includes a saddle 27 configured to support the hose 100 when the panel 20 is inverted with the second end 22 contacting against the surface 150. The saddle 27 includes a curved shape that extends between posts 30, 31. The curvature of the saddle 27 can have an elliptical shape or can include other shapes. In one example, the curvature of the saddle 27 is different than the curvature of the saddle 23 at the second end 22. In another example, the curvatures are the same. The saddle 27 can also include a curved shape between the first and second sides 28, 29 to allow the hose 100 to slide along the length of the assembly 10.

In one example, one or both saddles 23, 27 have an elliptical shape. The elliptical shape facilitates supporting the hose 100 when the panel 20 is at a non-perpendicular angle (e.g., 45) relative to the hose 100 (see FIG. 11). The elliptical shape can provide for the saddles 23, 27 to have an effective rounded shape when the panels 20 are positioned at the non-perpendicular angle.

The saddles 23, 27 each include a depth measured between the bottom of the saddle 23, 27 and the top of the respective posts 25, 26, 30, 31. The depths of the saddles 23, 27 can vary with one of the saddles 23, 27 having a smaller depth than the other. This gives the user a choice as to which way to invert the assembly 10 to support the hose 100. The different depths have different attributes. For example, the hose 100 may be easier to load into a saddle 23, 27 with a smaller saddle depth, but a larger saddle depth may prevent the hose 100 from being knocked out of the saddle 23, 27.

The different saddles 23, 27 also provide for supporting the hose 100 at different heights above the surface 150. The height is measured between the bottom of the saddle and the bottom edge of the panel 20. For example, the assembly 10 can be positioned in a first position (e.g., saddles 23 facing upward) to support a hose 100 at a higher elevation to accommodate a larger vehicle. The same assembly 10 can be inverted and positioned in a second position (e.g., saddles 27 facing upwards) to support a different hose 100 that extends outward from a smaller vehicle.

As illustrated in FIG. 3B, the second side 29 includes a receptacle 32 to receive the link 40 when the assembly 10 is in the folded orientation. The receptacle 32 includes side walls 33 that are sized and shaped to form a boundary to receive the link 40. The side walls 33 extend along the receptacle 32 and can extend completely around the receptacle 32, or around one or more limited sections of the receptacle 32. The receptacle 32 also includes a back surface 34. In one example, the link 40 contacts the back surface 34 in the folded orientation. In another example, the link 40 is positioned away from the back surface 34. The receptacle 32 can include various configurations. In one example, the receptacle 32 does not include a side wall 33. In one example, the receptacle 32 does not include a back surface 34. In one specific example, this includes the receptacle 32 being an opening that extends through the panel 20.

The panel 20 includes a thickness measured between the first and second sides 28, 29. The links 40 nest in the receptacles 32 in the folded orientation. In one example, the nested positioning of the links 40 and panels 20 results in the overall thickness of the assembly Q (see FIG. 2B) being less than a sum of the thicknesses of the individual panels 20 and links 40. This occurs because the links 40 and panels 20 overlapping thus decreasing the thickness.

A connector 35 extends from the second side 29 and is configured to form a hinge 50 with the link 40. In one example as illustrated in FIG. 3B, the connector 35 is positioned in the receptacle 32 and extends from the back surface 34. In another example, the connector 35 is positioned away from the receptacle 32. In the example with the connector 35 positioned in the receptacle 32, the connector 35 can be recessed and terminate below the side walls 33 or can extend outward beyond the side walls 33. In one example, the connector 35 includes curved fingers shaped and sized to receive a pin 43 (not shown in FIG. 3B) on the link 40. The connector 35 and pin 43 form a hinge that provides for pivoting movement of the link 40 relative to the panel 20. The connector 35 is positioned in proximity to the lateral side 65 of the panel 20 and is spaced inward from the lateral side 65.

As illustrated in FIG. 3A, another connector 36 extends outward from the first side 28. The connector 36 is configured to connect with a link 40 on the first side of the panel 20 and form a second hinge 51. The connector 36 is positioned in proximity to the lateral side 66 of the panel 20 and is spaced inward from the lateral side 66.

Figure 5:
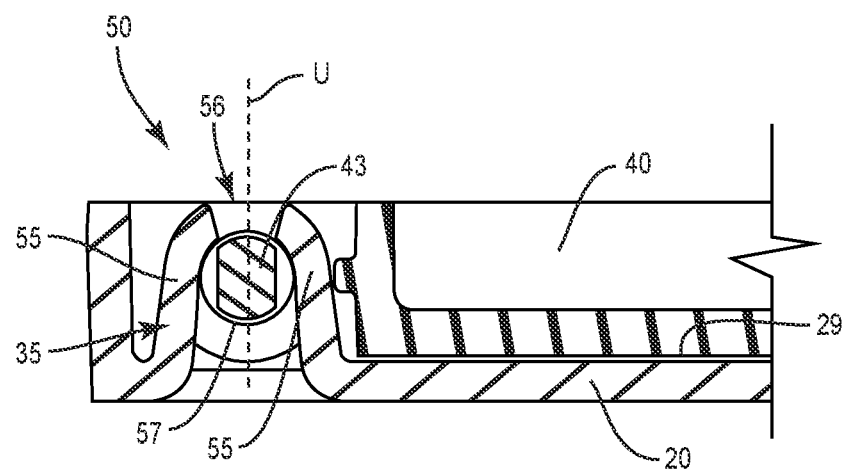
FIG. 5 illustrates a hinge formed by a connector of a panel and a pin of link.

In one example, the connectors 35, 36 include the same shape and structure. This facilitates manufacturing the panel 20 as it reduces the number of different designs. In one example, the connectors 36 each include an outer wall 55 that extends around and forms a seat. FIG. 5 illustrates the structure of the connector 35 that forms the first hinge 50. The hinge 50 is formed between the connector and a pin 43 of the link 40. The connector 35 includes an outer wall 55 that extends around and forms a seat 57. An opening 56 is formed in a gap in the wall 55 and is in communication with the seat 57. In one example, the outer wall 55 has a C-shape. The opening 56 faces outward away from the second side 29 of the panel 20. The opening 56 is sized to receive the pin 43 of the link 40. The pin 43 is sized to be inserted along the centerline U of the opening 56 and into the seat 57. The outward-facing opening 56 provides for receiving the pin 43 as the pin is moved along the centerline C, and prevents escape of the pin 43 when moving at different angular directions relative to the centerline C. This prevents the pin 43 from inadvertently escaping from the seat 57 during pivoting movement of the link 40.

The hinge 51 includes a similar structure with the connector 36 having the same structure as connector 35 and the link 40 including a pin 44 with similar structure to pin 43. In one example, the pins 43, 44 of the link 40 are easiest to insert into the respective seats 57 when the link 40 is in a folded orientation.

In one example, the connectors 35, 36 are positioned in proximity to the opposing lateral sides of the panel 20 (i.e., connector 35 at lateral side 65 and connector 36 at lateral side 66). This provides a link 40 to span diagonally across the gap 110 and connect at opposing lateral sides of adjacent panels 20. This is illustrated in FIG. 2C with the link 40 extending diagonally across the gap 110 between first and second panels 20 with the link 40 attached to a connector 35 on a second side 29 of a first panel 20, and to a connector 36 on a first side 28 of a second panel 20. The diagonal attachment of the link 40 between adjacent panels 20 increases the stability of the panels 20 to remain upright and not tip over when supporting the hose 100.

Figure 6A:
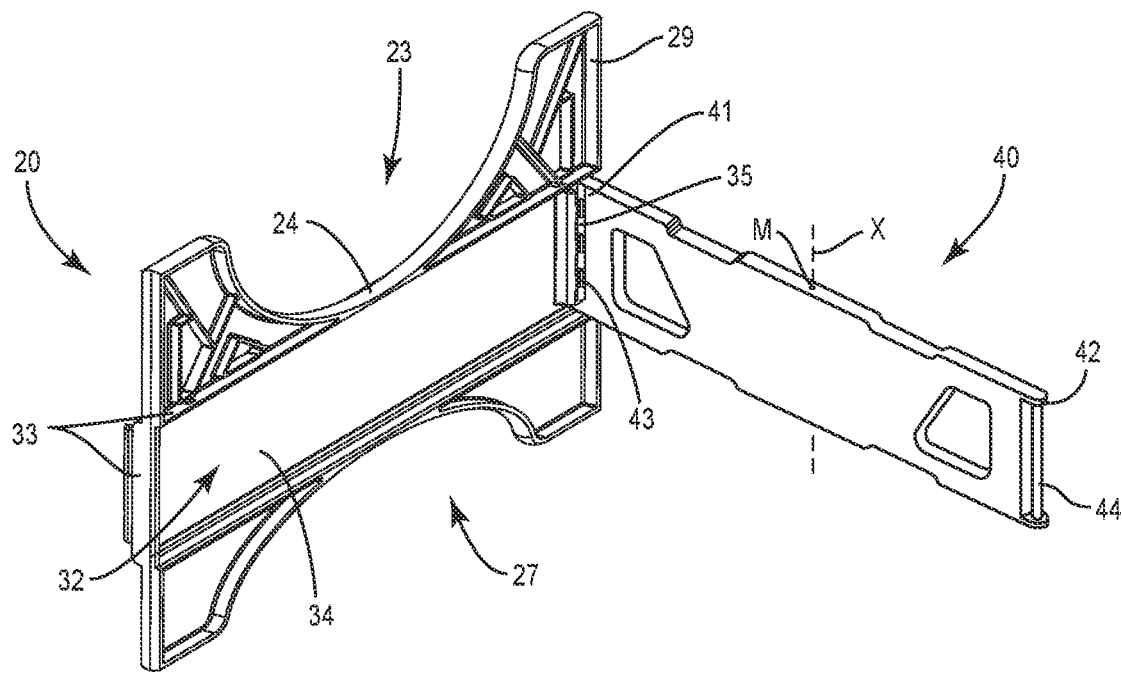
FIG. 6A is a perspective view of a link attached to a panel and in an extended orientation.
Figure 6B:
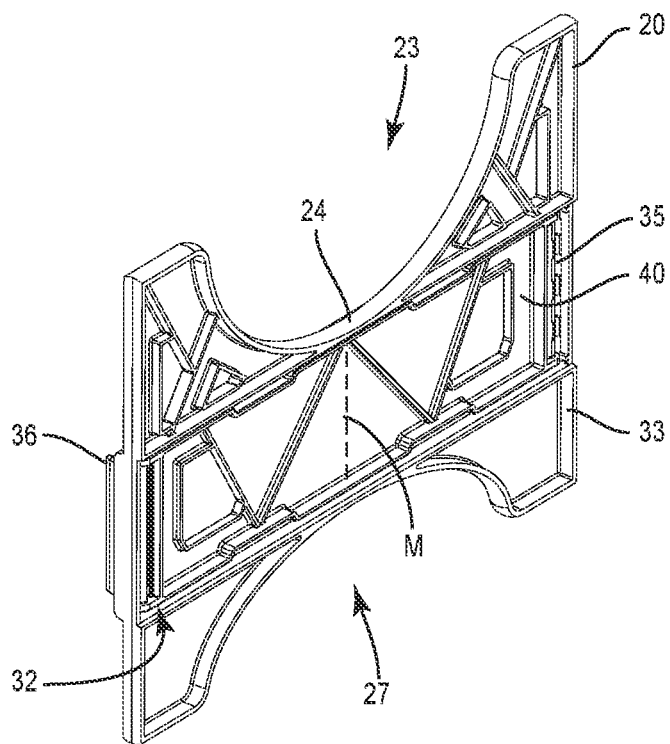
FIG. 6B is a perspective view of the panel and link of FIG. 5A with the link in a folded orientation.

FIGS. 6A and 6B illustrate a link 40 connected to a panel 20. The link 40 has an elongated shape with a first end 41 and an opposing second end 42. A pin 43 is positioned at the first end 41, and a pin 44 is positioned at the second end 42. The pins 43, 44 are configured to connect with the respective connectors 35, 36 of the adjacent panels 20. In one example, the pins 43, 44 include circular sectional shapes. The link 40 is sized to seat in the receptacle 32 in the folded orientation. In one example as illustrated in FIG. 5A, the link 40 has a substantially rectangular shape that matches the shape of the receptacle 32. In one example, the pins 43, 44 are parallel. In one example, each of the pins 43, 44 are aligned in a common plane that extends through the link 40. In one example, the link 40 is symmetrical about a central axis X. This provides for the link 40 to be connected in regardless of the orientation.

The links 40 are positioned vertically below the saddles 23, 27 when the assembly is in the different inverted orientations. This positioning prevents the links 40 from interfering with the contact of the hose 100 against the saddles 23, 27. The links 40 are positioned to support the hose 100 in the gaps 110 in the extended orientation. The links 40 contact the hose 100 with a smaller surface area than the panels 20.

In one example, the hose 100 is positioned in the saddles 23 or 27 while the assembly 10 is in the folded orientation. The assembly 10 is then moved to the extended orientation while continuing to support the hose 100. This limited and/or no contact between the links 40 and hose 100 reduces drag on the hose 100 and facilitates deployment. The links 40 are also positioned above the surface 150 in either inverted orientation of the assembly 10. This elevated positioning prevents the links 40 from dragging on the surface 150 during deployment. The positioning above the surface 150 also limits the amount of debris that is collected in the assembly 10 when the assembly 10 is moved across the surface 150, such as during deployment and folding.

Hinge 50 is positioned in proximity to the lateral side 65 of the panel 20 and is spaced inward from the lateral side 65. Hinge 51 is positioned in proximity to the lateral side 66 and is spaced inward from the lateral side 66. This positioning inward from the lateral sides 65, 66 facilitates the pivoting movement of the links 40. Hinge 50 is positioned outward from the back surface 34 or side 29 of the panel 20 thus allowing for the link 40 to pivot and contact against the back surface 34 or side 29. Hinge 61 is positioned outward from the side 28 and likewise provides for the full pivoting for the link 40 to contact against the side 28. Each hinge 50, 51 includes a rotation axis. In one example, the rotation axes are positioned inward from the lateral sides 65, 66 of the panel 20. In one example, the rotation axes are parallel.

The hinges 50, 51 are designed to separate upon the application of a force above a predetermined amount. The separation occurs by the exterior force causing one or both pins 43, 44 to escape from their respective seat 57. This predetermined force is less than the breaking strength of the walls 55 and pins 43, 44. Thus, one of more of the links 40 can separate from one or more of the panels during use to prevent damaging any of the panels 20 or links 40. Once separated, the hinges 50, 51 can be reassembled by re-inserted the one or both pins 43, 44 into the respective seats 57.

The hinges 50, 51 are further designed for a small amount of rotation perpendicular to the rotation axis of the hinge. This small rotation facilitates positioning the assembly 10 along an uneven surface 150. The rotation can also facilitate inverting the assembly 10 as necessary to support the hose 100 in either of the saddles 23, 27.

The thickness can be substantially constant across the panel 20. In one example, the thickness at the receptacle 32 is larger than the thickness of the other sections of the panel 20. This increased thickness provides for the link 40 to nest in the receptacle 32 in the folded orientation.

The link 40 nests with the panel 20 in the folded orientation as illustrated in FIG. 5B. In one example, the link 40 has a thickness to be recessed in the receptacle 32 in the folded orientation (e.g., the outer face of the link 40 is positioned within the receptacle 32). This provides for the panels 20 to contact directly against each other in the folded orientation. In another example, the link 40 extends outward beyond the receptacle 32 Nesting the links 40 in the receptacles 32 also causes the assembly 10 to be more stable preventing the panels 20 from sliding away from each other and preventing twisting of the assembly 10.

In the folded orientation, the link 40 is positioned in the receptacle 32. The link 40 can be aligned parallel with the panel 20. A face of the link 40 contacts against the back surface 34. In another example, the link 40 is aligned at a non-parallel angle relative to the panel 20. The axis of the hinge 50 can be positioned in the receptacle 32 which further contributes to the folding of the link 40.

In a folded orientation, a central section of the link 40 between the ends 41, 42 is positioned in the receptacle 32. This provides for the links 40 and panels 20 to overlap and reduce an overall size of the assembly 10. In one example, the link 40 is in the receptacle 32 which includes being recessed below the outer edge of the receptacle 32. In one example, this includes the link 40 having a thickness that is less than the depth of the receptacle 32 thus providing for the link 40 to be recessed below the outer edge. In one example, the link 40 extends outward from the receptacle 32 in the folded orientation. In one example, this includes the link 40 having a greater thickness than the depth of the receptacle and extends outward beyond the outer edge of the receptacle 32.

Figure 7A:
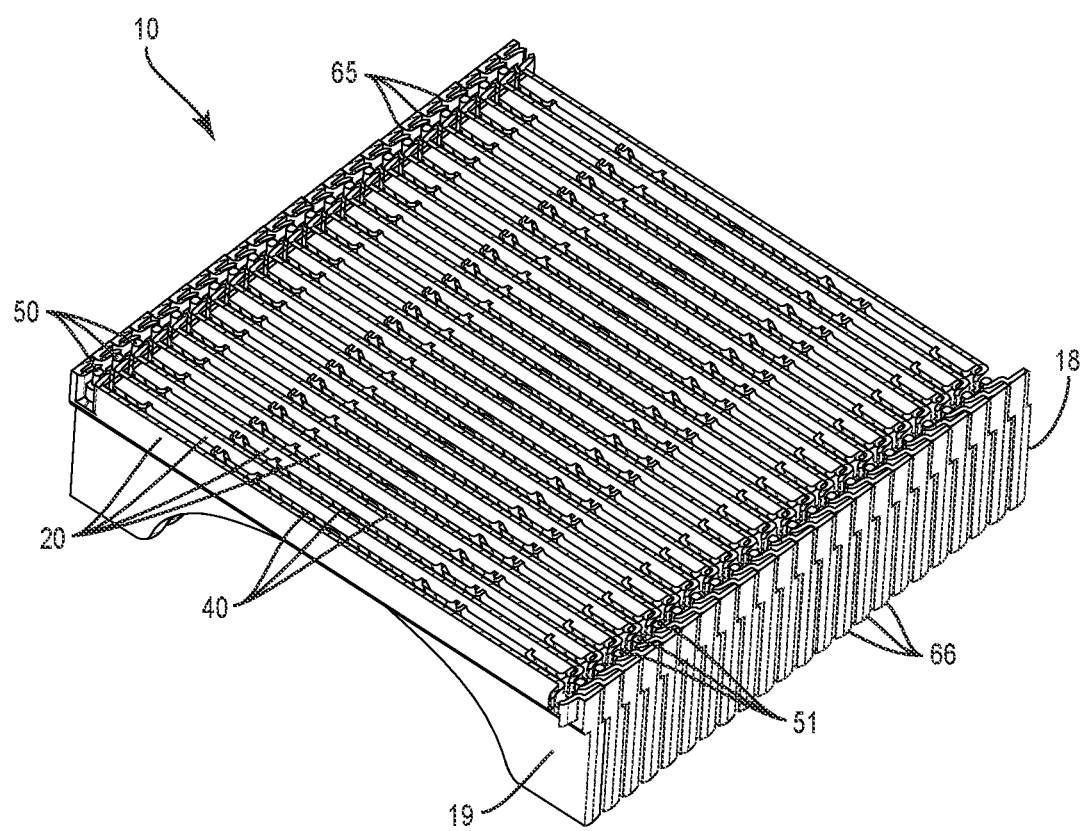
FIG. 7A is a section view of the assembly of FIG. 2A cut along line VII-VII.
Figure 7B:
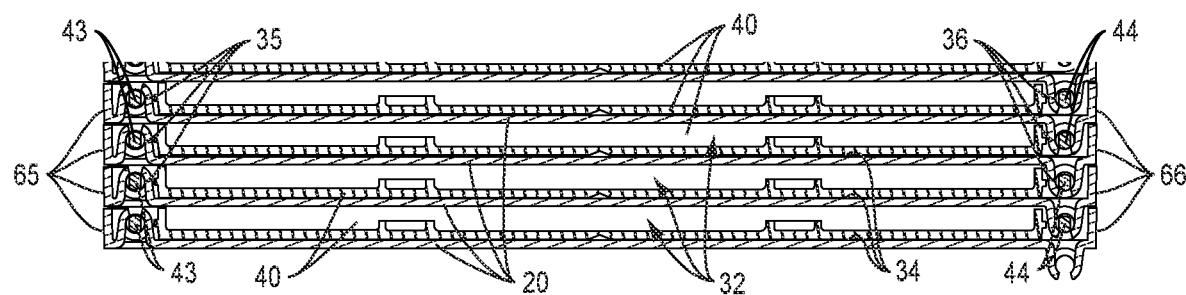
FIG. 7B is a top view of a section of the assembly of FIG. 7A.

FIGS. 7A and 7B illustrate the assembly 10 in a folded orientation with the links 40 nested in the panels 20. The panels 20 include the connectors 35 positioned inward from the lateral edge 65 and connectors 36 positioned inward from the opposing lateral edge 66. The pins 43 at the first end 41 of the link 40 are hingedly connected to the connectors 35. Pins 44 on the second end 42 are hingedly connected to the connectors 36. The connectors 35, 36 mate with the pins 43, 44 to form the hinges 50, 51.

In the folded orientation, the links 40 are nested in the receptacles 32 of the panels 20. The links 40 are fully nested with the outer side recessed within or flush with the outer edge of the receptacles 32. A front side of the links 40 contact against the back surface 34 of the receptacle 32. In one example with the links 40 flush with the outer edge of the receptacles 32, the links 40 contact against the side 29 of the adjacent panel 20. Further, the connector 44 on the side 29 (e.g., front side) of a first panel 20 is nested within the receptacle 32 on the side 28 (e.g., back side) of the adjacent panel 20. This nested positioning further reduces the size of the assembly 10 in the folded orientation and can assist in strengthening the assembly 10.

The nested position of the links 40 within the receptacles 32 provides for the assembly 10 to have a reduced thickness Q in the folded orientation. In one example, the nested position of the links 40 provides for a maximum strength for the assembly 10.

In one example, the panel 20 does not include a receptacle 32. In the folded orientation, the panel 20 contacts against the second side 29 of the panel 20.

In one example as illustrated in FIG. 6A, the link 40 is symmetrical about a vertical centerline X that extends through a midpoint M. This symmetry provides for either end 41, 42 of the link 40 to be connected to the panels 20 when the link 40 is in different rotational positions relative to the panels 20.

Figure 8:
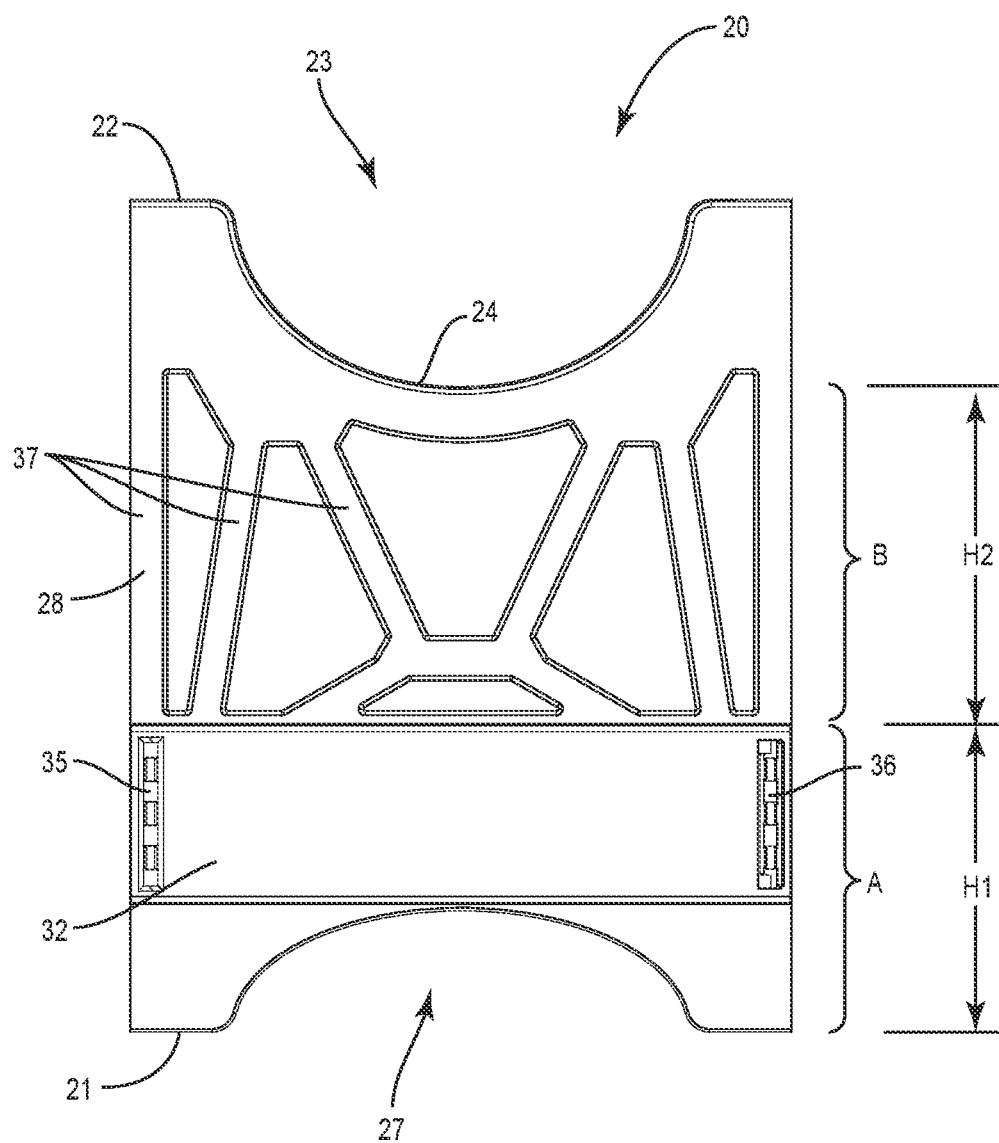
FIG. 8 is a front view of a panel.

As illustrated in FIG. 8, the panel 20 includes a base section A that extends between the second first end 21 and the opposing top side of the receptacle 32. The base section A includes a height H1. The panel 20 also includes a support section B that extends between the base section A and a bottom of the receptacle 32. The support section B includes a height H2. The support section B can include various structures, such as struts 37 to provide structural strength to the panel 20 to allow for support of the hose 100 along the saddle 23.

Figure 9:
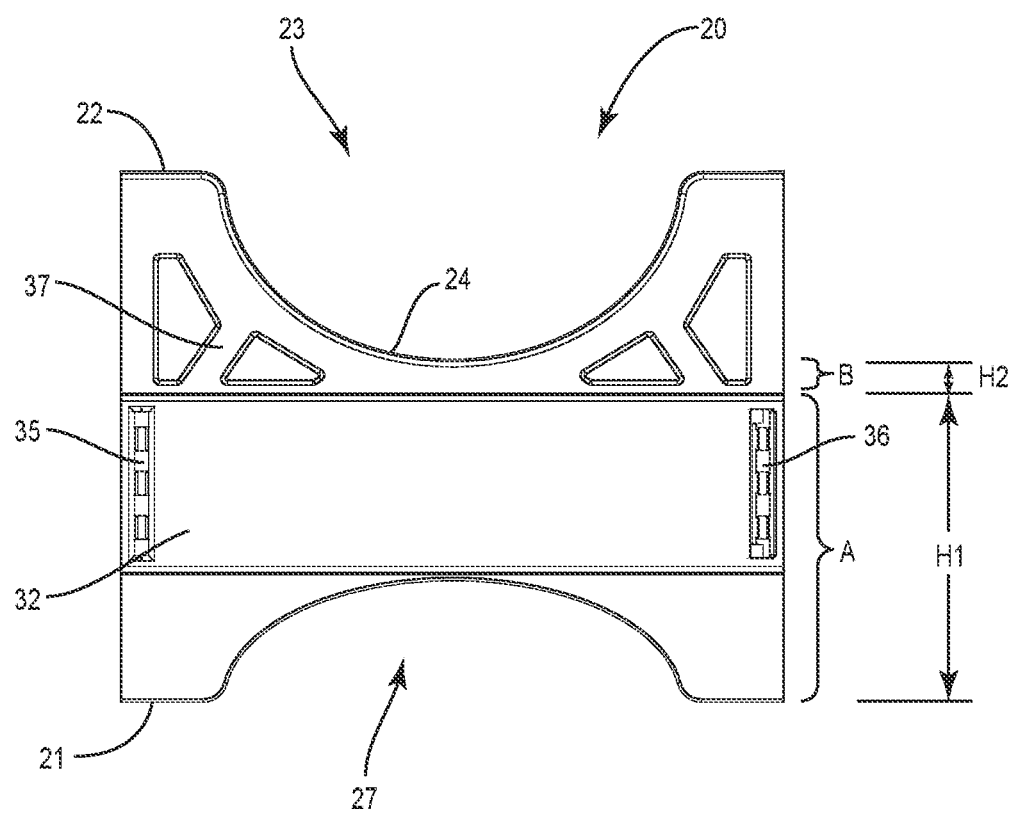
FIG. 9 is a front view of a panel.

A saddle height of the panel 20 is the combination of the base section A and the support section B (i.e., saddle height equals H1+H2). The saddle height is the distance the panel 20 supports the hose 100 above the surface 150. FIG. 9 illustrates a panel 20 with a shorter saddle height than that of the panel 20 of FIG. 8. The assembly 10 is configured with the saddle heights of the panels 20 progressively decreasing from the first end 18 to the second end 19. The progressive decrease can be continuous which each adjacent panel 20 having a shorter saddle height from the first end 18 to the second end 19. In another example, the progressive decrease is non-continuous with one or more adjacent panels 20 having the same saddle height. This still provides for the overall fall line of the hose 100 to slope downward along the length of the hose 100 and provide for fluid to drain through the hose 100.

In one example, each of the panels 20 in the assembly 10 include a base section A with the same height H1. This provides for the links 40 to attach to each panel 20 at the same location above the surface 150. Different panels 20 along the assembly 10 can include different support sections B with different heights H2. This difference in heights in the different panels 20 provides for supporting the hose 100 at a decreasing elevation along the length to provide for fluid flow. A panel 20 with a larger saddle height and larger H2 (e.g., FIG. 8) is positioned in closer proximity to the first end 18 of the assembly than a panel 20 with a smaller saddle height and smaller height H2 (e.g., FIG. 9) which is positioned in closer proximity to the second end 19.

In another example, panels 20 along the length of the assembly 10 include different base heights H1. The saddle heights still provide for a progressive decrease between the first and second ends 18, 19.

In use, the assembly 10 is placed on a surface 150 and elongated to the extended orientation. The panels 20 are positioned with the first end 21 contacting against the surface 150 and the saddles 23 facing upward away from the surface 150. The assembly 10 can be aligned along its length in a straight row or can be arranged with one or more curves depending upon the context of use.

Once positioned on the surface 150, the hose 100 is positioned in the saddles 23. The saddles 23 have a depth measured between the bottom point of the edge 24 and the posts 25, 26. In one example, the hose 100 is sized such that the top of the hose is positioned below the tops of the posts 25, 26. In another example, the depth is smaller than the hose 100 such that a portion of the hose 100 extends outward above the tops of the posts 25, 26.

In another example, the hose 100 is positioned in the assembly 10 when the assembly 10 is in the closed orientation. The assembly 10 is positioned on the surface 150 and then deployed to the extended position while the hose 100 remains in the saddle 23, 27. The curved surfaces of the saddles 23, 27 (e.g., 24 in FIG. 4) reduce drag and facilitate sliding of the hose 100 through the saddles 23, 27.

The overall length of the assembly 10 can be adjusted by adjusting the distances between the adjacent panels 20. The spacing of the panels 20 can be consistent along the length or can vary.

The hose 100 contacts against and is supported by the edges 24 of the panels 20. The panels 20 have a progressively decreasing saddle height such that those 100 is positioned with a downward slope for fluid to flow along the length. The links 40 are positioned vertically below the edges 24.

The assembly 10 can also be inverted and support a hose in the saddles 27 at the first end 21. The assembly 10 can be positioned along the length as necessary and the hose 100 positioned in the saddles 27. The links 40 are positioned vertically below the edges of the saddles 27. The different inverted orientations can provide for supporting the hose 100 at different heights above the surface 150. This provides for the assembly 10 to have additional utility for use in different contexts.

The links 40 are positioned below the saddle 23 when the assembly 10 is in a first inverted position and also below the saddle 27 when the assembly is in an inverted position. This prevents the links 40 from interfering with the panels 20 contacting against and supporting the hose 100. The links 40 do support the hose 100 in the gaps 110 to prevent the hose 100 from drooping between the panels 20. For stiffer hoses 100, the links 40 may not contact the hose 100. The links 40 are further positioned away from the surface 150 to prevent drag across the surface 150 when the assembly 10 is being deployed.

The links 40 have a smaller area, mass, and weight than the panels 20. This reduces the overall weight of the assembly 10, and reduces the amount of material (e.g., plastic, metal) needed to construct the assembly 10.

When the assembly 10 is not in use, the assembly 10 can be placed in the folded orientation. This includes the links 40 folded between the adjacent panels 20 and the adjacent panels 20 positioned together. The folded orientation has a small footprint that facilitates storage.

In one example, each panel 20 includes a receptacle 32 that is open outward from one of the first and second sides 28, 29. In the folded orientation, a link 40 seats in the receptacle 32 of a single panel 20. In another example, one or more of the panels 20 include receptacles 32 on both of the first and second sides 28, 29. In the folded orientation, a link 40 seats in both of the receptacles 32 of the adjacent panels 20 (i.e., the link 40 seats in the receptacle 32 on a first side 28 of a first panel 20 and a receptacle 32 on a second side 29 of a second panel 20).

Figure 10:
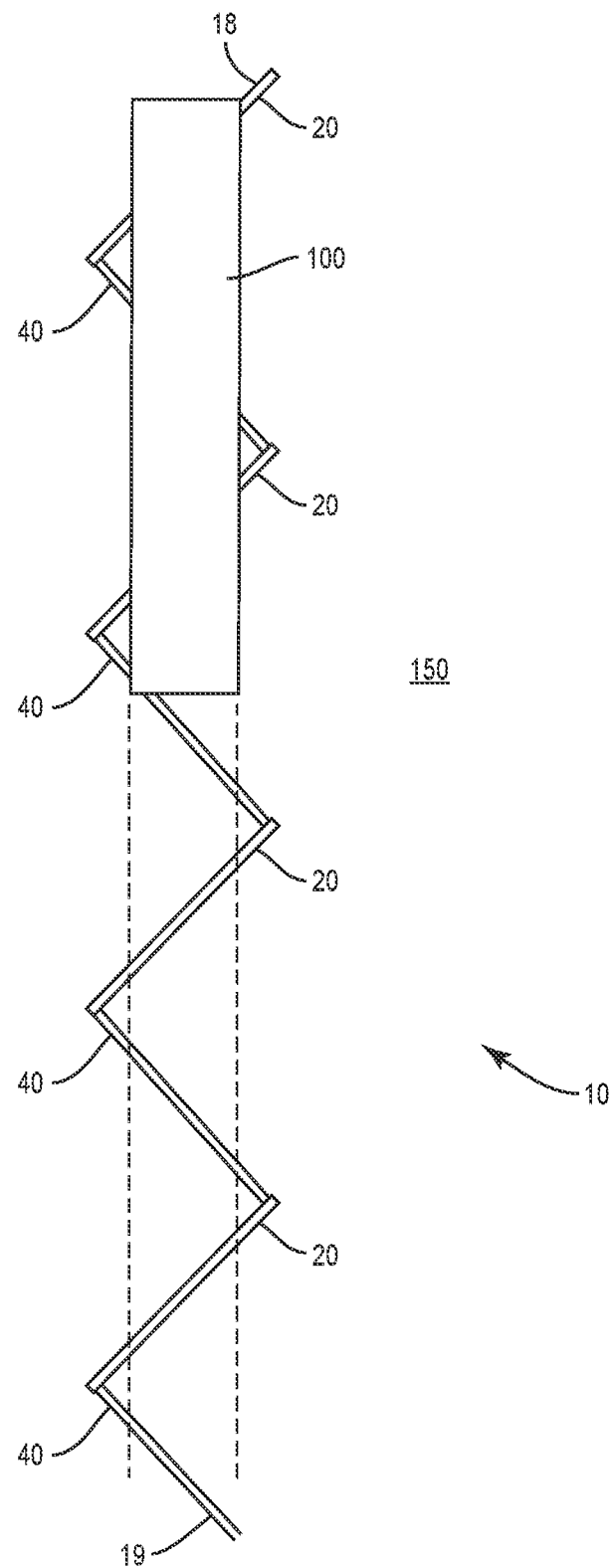
FIG. 10 is a schematic top view of an assembly in an extended orientation and supporting a hose.
Figure 11:
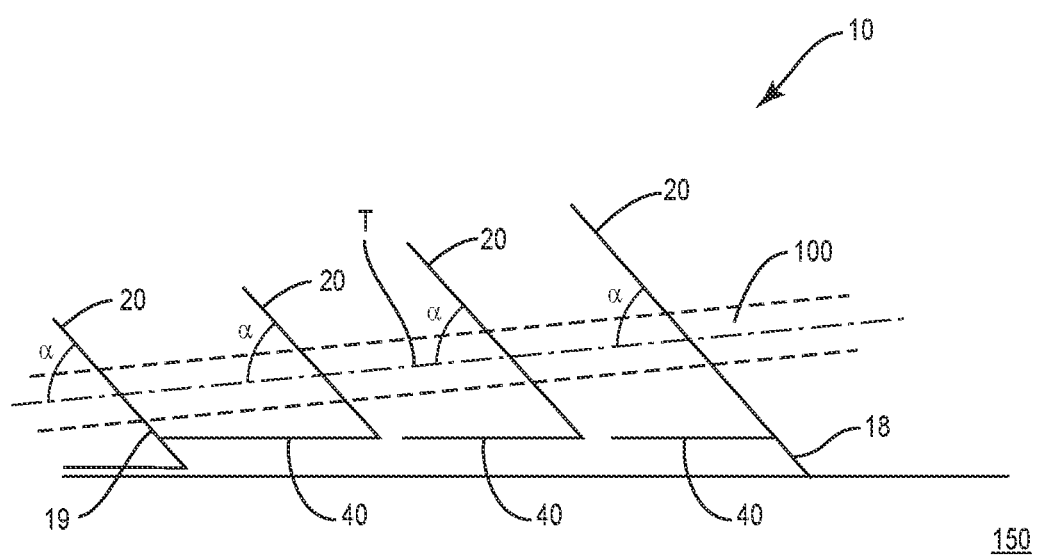
FIG. 11 is a side schematic view of the assembly of FIG. 10.

FIGS. 10 and 11 illustrate an example of the assembly 10 in an extended orientation supporting a hose 100 above a surface 150. The assembly 10 supports the hose 100 in a downward orientation with a first end 18 supporting the hose 100 at a higher elevation above the surface 150 than a second end 19. The panels 20 are aligned at an angle α relative to a centerline T of the hose 100. In one example, the angle α is 45°. In other examples, the angle α ranges from between 30°-60°. The saddles 23, 27 can have elliptical shapes. The elliptical shapes can provide for an effective rounded shape at the angle α which facilitates support of the hose 100. FIG. 10 illustrates a section of the hose 100 in solid lines with a remainder shown in dashed lines to more clearly illustrate the assembly 10.

The assembly 10 can be used on a variety of different surface 150. In one example, the assembly 10 is used to support a hose 100 that is connected to an RV. The assembly 10 can also be used to support hoses 100 in a variety of different contexts, including but not limited to draining water from a swimming pool, and supporting a pipe that is moving fluid from an industrial machine.

Figure 12:
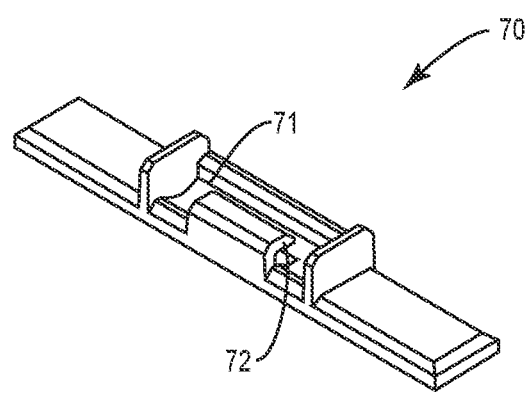
FIG. 12 is a perspective view of a foot that is configured to attach to a panel.

The panels 20 can include one or more feet 70 to add stability, particularly when the panels 20 are used on uneven terrain and/or in high winds. The feet 70 can be detachable and selectively used as needed. FIG. 12 illustrates a foot 70 with a lower surface configured to contact against the surface 150. The shape and size of the foot 70 can vary, with one example including a planar lower surface. A seat 71 is positioned on the upper side and is sized to receive a post 30, 31 of the panel 20. A lip 72 can extend over the seat 71 and engage with an edge 73 (see FIG. 3B) of the post 30, 31 to secure the foot 70.

In one example, the hinges 50, 51 are formed by the panels 20 having connectors 35, 36 with walls 55 and seats 57, and the links 40 include pins 43, 44. This structure can be reversed with the pins 43, 44 positioned on the panels 20 and the connectors 35, 36 positioned on the links 40. The hinges 50, 51 can also include other constructions, including but not limited to leaves that mate together to form a knuckle that receives a pin, and a detent that forms a recessed opening that receives a ball. In the various examples, the hinges 50, 51 can have the same or different configurations.

In the vary uses, the assembly 10 can be positioned on a variety of different surfaces 150. In one example with use on an RV, the surface 150 is formed by the ground or a parking lot. In another example, the assembly 10 is used indoors and the surface 150 is formed by a floor of a building.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive.

What is claimed is:

1. A hose support assembly to support a hose above a surface, the hose support assembly comprising:
   a plurality of panels, each of the panels comprising a saddle configured to contact against the hose;
   a plurality of links, each of the links comprising a first end and a second end to connect together adjacent ones of the panels and with the panels connected together in a series;
   wherein the hose support assembly is movable between an extended orientation and a folded orientation with the extended orientation comprising the panels spaced apart by gaps and the links bridging the gaps, and the folded orientation comprising the links folded between the adjacent ones of the panels;
   wherein the panels comprising a first shape and the links comprising a different second shape; and wherein the second shape of the links is unchanged between the extended orientation and the folded orientation.

2. The hose support assembly of claim 1, further comprising receptacles formed in the panels and with the links positioned in the receptacles in the folded orientation and the adjacent panels abutted together in the folded orientation.

3. The hose support assembly of claim 2, wherein the first ends of the links are connected to the first ones of the panels at hinges that are positioned in the receptacles.

4. The hose support assembly of claim 1, wherein the links are symmetrical about a vertical centerline that extends through a midpoint between the first end and the second end.

5. The hose support assembly of claim 1, further comprising a first rotation axis at the first ends of the links and a second rotation axis at the second ends of the links and the first rotation axis and the second rotation axis are spaced away from lateral edges of the panels.

6. The hose support assembly of claim 1, wherein the links are completed positioned between the adjacent ones of the panels in the folded orientation.

7. The hose support assembly of claim 6, wherein the saddle heights of at least two of adjacent ones of the panels is equal.

8. The hose support assembly of claim 1, wherein the saddle is a first saddle, and each of the panels further comprises a second saddle positioned between feet located along a bottom side and with the first saddle and the second saddle comprising different heights and wherein the links are connected to the panels between the first saddle and the second saddle.

9. The hose support assembly of claim 1, wherein the links are aligned parallel to one another in the folded orientation.

10. A hose support assembly to support a hose above a surface, the hose support assembly comprising:
panels connected together in a series, each of the panels comprising:
a first side;
a second side;
a top edge comprising a saddle configured to contact against the hose;
a bottom edge configured to contact the surface;
first and second lateral edges;
links comprising a first end and a second end, the links having a different shape than the panels and with the links being flat and having a centerline that extends between the first end and the second end that is straight; and
wherein the links are configured to connect together adjacent ones of the panels with the first ends pivotally connected to the first sides of the panels and the second ends pivotally connected to the second sides of the panels and with the first ends and the second ends positioned away from the first and second lateral edges.

11. The hose support assembly of claim 10, wherein the links comprise a rectangular shape.

12. The hose support assembly of claim 10, wherein the hose support assembly is movable between an extended orientation and a folded orientation with the extended orientation comprising the panels spaced apart by gaps and the links bridging the gaps, and the folded orientation comprising the links nested in the panels.

13. The hose support assembly of claim 12, wherein each of the panels further comprise a receptacle that is recessed into the first side, wherein the receptacle is sized to receive one of the links such that the link is nested in the panel when the hose support assembly is in the folded orientation.

14. The hose support assembly of claim 13, wherein the receptacle comprises:
a back surface;
side walls that extend along a perimeter of the receptacle; and
an open side that faces outward away from the back surface;
wherein the link is positioned in contact with the back surface in the folded orientation.

15. The hose support assembly of claim 10, wherein the saddle is a first saddle, and each of the panels further comprises a second saddle positioned along the bottom edge with the first saddle and the second saddle comprising different heights.

16. The hose support assembly of claim 10, wherein the links are symmetrical about a vertical centerline that extends through a midpoint between the first end and the second end.

17. A hose support assembly to support a hose above a surface, the hose support assembly comprising:
a plurality of links comprising:
a first end;
a second end;
a flat first face that extends between the first end and the second end;
a flat second face that extends between the first end and the second end;
a plurality of panels connected together in a series, each of the panels comprising:
a first side;
a second side;
a top edge with a saddle configured to receive the hose;
a bottom edge;
a first lateral edge;
a second lateral edge;
a first hinge pivotally connecting the panel to the first end of a first one of the links;
a second hinge pivotally connecting the panel to the second end of a second one of the links;
wherein the hose support assembly is movable between an extended orientation and a folded orientation with the extended orientation comprising the panels spaced apart by gaps and the links bridging the gaps, and the folded orientation comprising the links nested in the receptacles of the panels; and
wherein a shape of the links is the same in each of the extended orientation and the folded orientation.

18. The hose support assembly of claim 17, wherein the panels comprise the first hinge on the first side and the second hinge on the second side, and wherein the first hinge and the second hinge are spaced inward from the first lateral edge and the second lateral edge.

19. The hose support assembly of claim 17, further comprising a recess that extends into the first side of each of the panels and wherein the links nest in the receptacle in the folded orientation.

20. The hose support assembly of claim 17, wherein the links are symmetrical about a vertical centerline that extends through a midpoint between the first end and the second end.

* * * * *